Nov. 17, 1959     I. W. ELLSWORTH     2,912,813
AERATING ROLLER ATTACHMENT FOR LAWN MOWERS
Filed Sept. 28, 1956
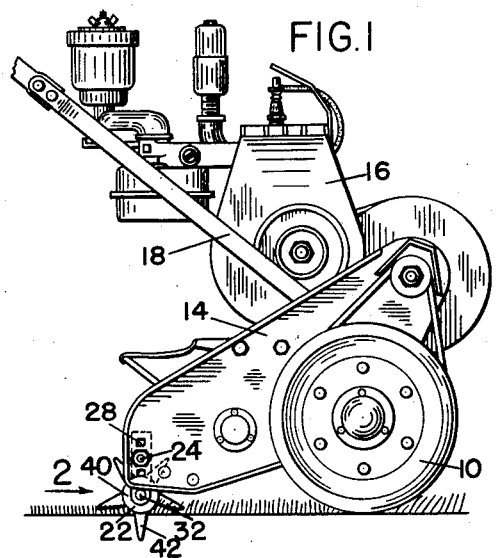
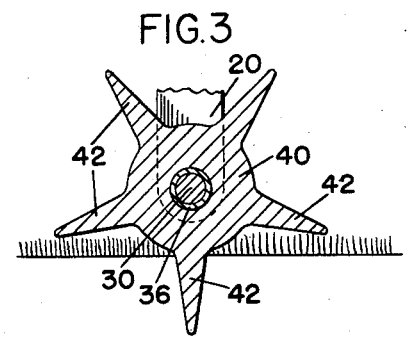
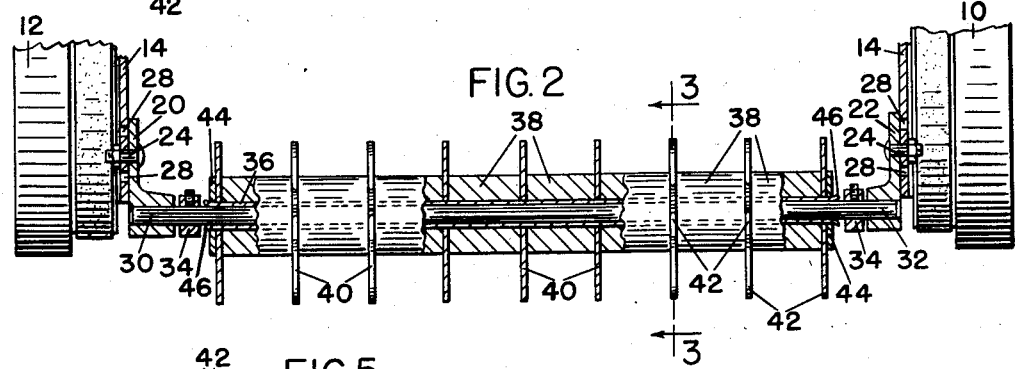
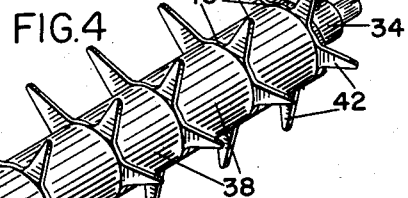
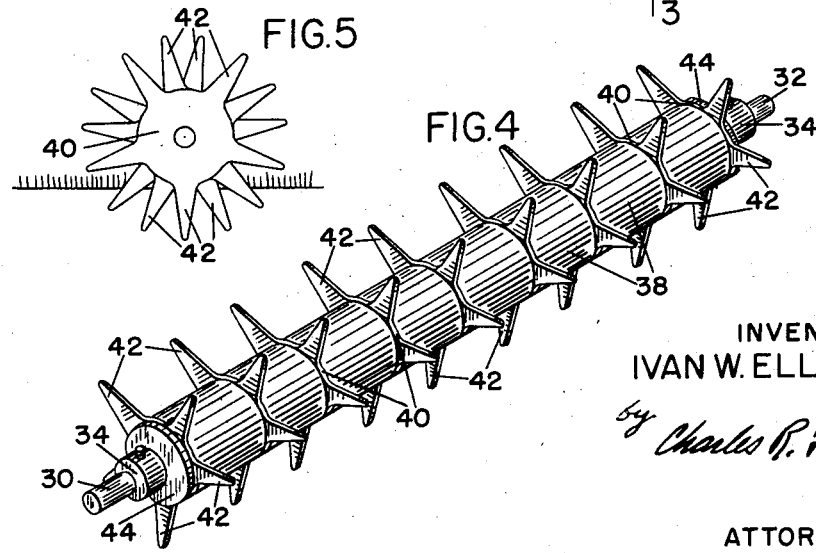
INVENTOR
IVAN W. ELLSWORTH
ATTORNEY United States Patent Office 2,912,813
Patented Nov. 17, 1959

2,912,813

AERATING ROLLER ATTACHMENT FOR LAWN MOWERS

Ivan W. Ellsworth, Framingham Centre, Mass.

Application September 28, 1956, Serial No. 612,860

5 Claims. (Cl. 56—249)

This invention relates to a new and improved roller to be attached to a power mower or hand lawn mower more or less in the usual manner and replacing the usual roller, the new roller having means adapting the same for aeration of the turf as well as forming the third wheel for the lawn mower; the provision of an attachment in the form of a replacement roller as above stated including a series of spikes or star wheels which are mounted upon said roller and which are made in such a way as to provide for positive puncturing of the turf and the soil, thus providing aeration holes for the lightening and improved wetting of the soil for the improvement of the turf, the practice of aeration being generally well known in the art.

Heretofore aeration of turf has been accomplished by hand spikes and large rolls with spikes thereon. The hand spikes require a considerable amount of labor and vertical motion on the part of the operator, and rotary spike wheels require great weight and the same are very difficult to maneuver and to push over the turf. However, such aeration is necessary for promoting proper growth and spreading of grass to make a healthy and good lawn, and this is particularly true as for instance as to greens for golf courses.

By means of the present invention, the aeration is accomplished without any extra work done by providing the roller of the lawn mower with a replacement roller, the replacement roller comprising the subject matter of the present invention and utilizing the weight and motivating means of the lawn mower to accomplish the aeration.

Further objects of the invention include the inexpensive, easy and effective apparatus for aerating a lawn at the same time and by a part of the apparatus by which the grass is cut.

Other objects and advantages of the invention will appear hereinafter.

Reference is to be had to the accompanying drawings, in which

Fig. 1 is a view in side elevation of a lawn mower utilizing the present invention;

Fig. 2 is an enlarged view in elevation, partly in section, showing the novel roller and looking in the direction of arrow 2 in Fig. 1;

Fig. 3 is an enlarged section on line 3—3 of Fig. 2;

Fig. 4 is a perspective view of the new roller attachment; and

Fig. 5 is a diagrammatic view illustrating the action of the device.

In the first place, it should be understood that the present aerating roller is adapted to be used as a replacement for the existing roller on any kind of a mower whether hand or power operated. However, the invention has been illustrated as applied to a conventional power mower provided with wheels 10 and 12, frame 14, engine 16, handle 18 and other appurtenant parts. It is to be noted that the same means may be utilized for arranging the novel replacement roller attachment as was used for the usual roller in the original apparatus; and to this end there is shown a pair of brackets 20 and 22 which are alike but reversed, see Fig. 2. Each bracket is provided with a fastener in the form of a bolt 24 which passes through a selected hole 28 for vertical adjustment of the roller apparatus, holes 28 being located in the frame 14 or other convenient part of the mower.

Each bracket is provided with a bore receiving the end of a rod or shaft as shown at 30 and 32 in Fig. 2, and this rod or shaft may be held in place against longitudinal motion by collars or the like 34. It is of course understood that any other means may be used for securing the rod 30 in place and any other means than rod 30 may be utilized for maintaining the roller to be described in position on the machine.

In the case illustrated, there is provided on the rod 30 an elongated tube 36 upon which there is longitudinally mounted a series of loose short rollers 38 which may be of wood or any other suitable material. These rollers are completely independent of each other and the tube and rotate by contact with the ground or turf.

Interposed between selected pairs of rollers, there is a flat wheel or disc indicated at 40, and each wheel or disc is also loosely mounted so that it can rotate on the tube 36. Each disc may have generally the same diameter as that of the respective short rollers, and each disc has a circumferential series of outwardly-extending radial spikes 42.

The exact shape, size and length of these spikes is immaterial to the scope of the invention, but it is pointed out that as the machine of Fig. 1 proceeds forwardly to the right, each spike will engage the ground and be forced to penetrate the same due to the weight of the machine, whether a hand or power mower is utilized. Each disc 40 is forced to rotate because of the penetration of the respective spikes 42 and as clearly shown in Fig. 5, one spike 42 will still be engaged in the ground rotating its respective disc at the time the succeeding spike 42 engages the ground and is thereby forced into it.

In order to mount the rollers 38 and discs 40 against endwise movement with relation to tube 36, there may be provided end washers 44 held in position by flared ends of the tube 36 as indicated at 46.

The entire assembly of course is capable of being made to fit various sizes of machines simply by using narrower rollers or spacers to maintain a minimum endwise motion and the entire attachment is very easily installed or removed from the existing lawn mower merely by inserting or removing the shaft 30 from the holding brackets 20.

Each disc and roller is rotatable freely on the tube in either direction independently of each other and of the tube, thereby allowing the mowing machine to be moved in curved lines and without any detriment to the lawn by digging in. The spikes are caused to turn by the motion of the lawn mower in either forward or reverse direction or a combination of the two as when turning right or left. The entire weight of the machine can be made to rest on the device by "heeling" the lawn mower by pushing down on the handle. When the lawn mower is used in its ordinary position for cutting grass, the points of the spikes are made to project into the ground by the motion of the lawn mower in combination with the weight distribution and the spatial arrangement of the spikes on the discs, and it is pointed out that since the grass is cut prior to the projection of the spikes into the turf, a maximum projection of the spikes into the soil is provided because the roller follows the cutter.

Having thus described my invention and the advantages thereof, I do not wish to be limited to the details herein disclosed, otherwise than as set forth in the claims, but what I claim is:

1. An attachment for lawn mowers comprising a roller including a support, a plurality of independent relatively short rollers on the support, said rollers being rotatable thereon, and a freely rotatable spiked disc between each pair of rollers, the spikes of the disc extending radially outwardly beyond the surface of the rollers to an extent to be fully entered into the turf, the rollers riding fully on the turf and supporting the attachment on the turf.

2. An attachment for lawn mowers comprising a roller adapted to replace the conventional roller, said attachment comprising a supporting means adapted to be mounted upon the lawn mower, a series of relatively short rollers thereon and a series of independent, freely rotatable spiked discs, there being a disc located between selected pairs of adjacent rollers, each disc including a hub from which the spikes extend, the spikes extending generally radially outwardly beyond the surface of revolution of the rollers, the latter resting on the turf, the spikes being adapted to engage and penetrate the turf as the lawn mower is moved to cut the lawn, said rollers having a relatively large diameter covering the hubs of the disc.

3. In combination with a lawn mower having a frame, a shaft, means on the mower to mount the shaft rigidly on said frame, a roller upon said shaft, said roller comprising a series of independent separate relatively short rollers and a series of spiked discs alternating with said rollers, said discs being independently mounted both with respect to the short rollers and to the supporting shaft, said rollers extending a substantial distance radially from the shaft and supporting the lawn-mower at the rear portion thereof.

4. In combination with a lawn mower having a frame, a shaft, a roller upon said shaft, said roller comprising a series of independent separate relatively short rollers and a series of flat spiked discs alternating with said rollers, said discs being independently mounted both with respect to the short rollers and to the supporting shaft, the rollers extending from disc to disc, the spikes on each disc extending generally radially outwardly and there being a plurality of spikes on each disc located at either side of a diameter of the disc so that the latter are forced independently to rotate as the spikes penetrate the turf, means to mount the shaft in generally fixed position on the frame with the spikes always extending below the frame when pointing down, said spikes substantially fully penetrating the turf at each rotation of the discs.

5. An attachment for lawn mowers comprising a roller adapted to replace the conventional roller, said attachment comprising a shaft adapted to be mounted upon the lawnmower, a series of relatively short rollers thereon and a series of spiked discs, said rollers and discs being freely rotatable on the shaft, there being a disc located between selected pairs of adjacent rollers, the spikes of the discs extending generally radially outwardly beyond the surface of the rollers and being adapted to engage and penetrate the turf as the lawn mower is moved to cut the lawn, and the rollers having a relatively large diameter to rest on the ground and support the lawnmower both in use and at rest.

References Cited in the file of this patent

UNITED STATES PATENTS

| | | |
|---|---|---|
| 2,032,777 | Thomas | Mar. 3, 1936 |
| 2,231,821 | Sprouse | Feb. 11, 1941 |
| 2,476,084 | Cour | July 12, 1949 |
| 2,801,512 | Karaktin | Aug. 6, 1957 |